(12) United States Patent
Reiger

(10) Patent No.: US 12,351,534 B2
(45) Date of Patent: Jul. 8, 2025

(54) COMPOSTING SYSTEM

(71) Applicant: High Caliper Growing, Inc., Oklahoma City, OK (US)

(72) Inventor: Kurt E. Reiger, Oklahoma City, OK (US)

(73) Assignee: HIGH CALIPER GROWING, INC., Oklahoma City, OK (US)

( * ) Notice: Subject to any disclaimer, the term of this patent is extended or adjusted under 35 U.S.C. 154(b) by 413 days.

(21) Appl. No.: 16/400,809

(22) Filed: May 1, 2019

(65) Prior Publication Data
US 2020/0346988 A1 Nov. 5, 2020

(51) Int. Cl.
*C05F 17/964* (2020.01)
*C05F 17/907* (2020.01)

(52) U.S. Cl.
CPC .......... *C05F 17/964* (2020.01); *C05F 17/907* (2020.01)

(58) Field of Classification Search
CPC ........... A01G 9/02; A01G 9/026; C05F 17/02; C05F 17/907
See application file for complete search history.

(56) References Cited

U.S. PATENT DOCUMENTS

| | | |
|---|---|---|
| 216,311 A | 6/1879 | Couch |
| 1,912,914 A | 6/1933 | O'Brien |
| 4,105,412 A * | 8/1978 | Petzinger ............... C05F 17/907 422/275 |
| 4,439,950 A | 4/1984 | Kelley |
| 4,574,522 A | 3/1986 | Reiger et al. |
| 4,668,566 A * | 5/1987 | Braun ............... A61F 13/15658 156/220 |
| 4,888,914 A | 12/1989 | Reiger |
| 5,082,720 A | 1/1992 | Hayes |
| 5,103,588 A | 4/1992 | Reiger |
| 5,167,092 A | 12/1992 | Reiger |
| 5,393,313 A | 2/1995 | Reiger |
| 5,706,605 A | 1/1998 | Alcazar et al. |
| 5,768,825 A | 6/1998 | Reiger |

(Continued)

FOREIGN PATENT DOCUMENTS

| | | | |
|---|---|---|---|
| JP | 05304835 | 11/1993 | |
| KR | 20140147511 | 12/2014 | |
| SE | 508183 C2 * | 9/1998 | .......... C05F 17/0205 |

OTHER PUBLICATIONS

Tokiwa, Yutaka et al. "Biodegradability of plastics." International Journal of Molecular Sciences vol. 10, 9 3722-42. Aug. 26, 2009, doi:10.3390/ijms 10093722 (Year: 2009).*

(Continued)

*Primary Examiner* — Michael L Hobbs
(74) *Attorney, Agent, or Firm* — McAfee & Taft

(57) ABSTRACT

A composting system is provided for efficiently composting material. The composting system is comprised of a container and a hood. The container is formed from a permeable material, such as a permeable fabric, and has a floor and at least one sidewall. The at least one sidewall has an inner surface and an outer surface. An upper opening of the container is defined by the at least one sidewall of the container. The hood is configured to retain moisture and heat within the container. The hood is fitted to cover the upper opening of the container and extend down over at least a portion of the outer surface of the at least one sidewall of the container.

18 Claims, 5 Drawing Sheets

(56) References Cited

U.S. PATENT DOCUMENTS

| | | | |
|---|---|---|---|
| 6,202,348 | B1 | 3/2001 | Reiger |
| 6,218,177 | B1* | 4/2001 | Nattrass ................ C05F 17/907 |
| | | | 435/290.1 |
| 6,612,072 | B2 | 9/2003 | Busby et al. |
| 8,429,852 | B1 | 4/2013 | Fula |
| 8,528,250 | B2 | 9/2013 | Nelson et al. |
| 8,826,590 | B2 | 9/2014 | Cross et al. |
| 8,950,110 | B2 | 2/2015 | Fula |
| 9,155,252 | B2 | 10/2015 | Setzer |
| 2002/0048415 | A1 | 4/2002 | Derby et al. |
| 2002/0121720 | A1 | 9/2002 | Davies et al. |
| 2003/0029080 | A1 | 2/2003 | Busby et al. |
| 2004/0242108 | A1 | 12/2004 | Russell et al. |
| 2005/0166451 | A1 | 8/2005 | Stachnik |
| 2006/0078987 | A1* | 4/2006 | Krier ..................... B65F 1/1415 |
| | | | 435/290.1 |
| 2006/0111481 | A1 | 5/2006 | Pearson et al. |
| 2007/0111305 | A1* | 5/2007 | O'Neill ................ C05F 17/964 |
| | | | 435/290.2 |
| 2008/0098648 | A1* | 5/2008 | Reiger ............... A01G 13/0237 |
| | | | 47/32.7 |
| 2008/0124791 | A1* | 5/2008 | Bucci ....................... B65F 1/06 |
| | | | 435/290.4 |
| 2009/0223123 | A1 | 9/2009 | Weder |
| 2011/0289838 | A1 | 12/2011 | Cirello |
| 2013/0055636 | A1 | 3/2013 | Ager |
| 2013/0193148 | A1 | 8/2013 | Fula |
| 2013/0255148 | A1 | 10/2013 | Setzer |
| 2017/0049063 | A1 | 2/2017 | Nielsen |
| 2018/0084734 | A1 | 3/2018 | Reiger et al. |
| 2018/0213727 | A1 | 8/2018 | Reiger |
| 2019/0104690 | A1 | 4/2019 | Reiger |
| 2020/0071030 | A1* | 3/2020 | Ager ..................... A01G 9/026 |

OTHER PUBLICATIONS

Machine Translation of SE508183C2 (Year: 2022).*
Article entitled "Nursery Performance of Selected Shade-Tree Species Grown in 'Field-Grow' Fabric Containers," by W. R. Remphrey, S. R. Rimmer and M. J. Blouw, Canadian Journal of Plant Science, vol. 70, pp. 337-343 (Jan. 1990).
Root Control Bag Growing System brochure entitled "The Tapered Bag" (undated but admitted to be prior art).
Drawings of a prior art growing trough (undated but admitted to be prior art).
Riverstone, Portable Composting Sack, Website: www.riverstoneindustries.com, p. 1 (undated but admitted to be prior art).

* cited by examiner

COMPOSTING SYSTEM

TECHNICAL FIELD

The present disclosure relates generally to composting systems, and, more particularly, to composting systems configured to retain moisture and heat within a compost container.

BACKGROUND

Composting is an aerobic method of decomposing solid, organic materials otherwise deemed waste into a usable soil conditioner. This soil conditioner, the compost, is rich in nutrients and greatly desired by a number of people including nursery plant growers, gardeners, vegetable growers, landscapers and others involved in horticulture and agriculture. Compost is beneficial as a soil conditioner, fertilizer, natural pesticide and for other uses. Composting typically requires three elements: (1) human management, (2) aerobic conditions, and (3) development of internal, biological heat.

Currently available composting systems suffer from inadequate air supply, lack of heat retention, and an inability to retain an appropriate amount of moisture. As a result of these deficiencies, the composting process does not proceed in an efficient manner. The present invention provides for an efficient composting system that overcomes these deficiencies.

SUMMARY

In accordance with the present invention, a composting system is provided which overcomes the deficiencies described above, and has other advantages.

In one embodiment, a composting system is provided. The composting system is comprised of a container and a hood. The container is formed from a permeable material and has a floor and at least one sidewall. The at least one sidewall has an inner surface and an outer surface. An upper opening of the container is defined by the at least one sidewall of the container. The hood is configured to retain moisture and heat within the container. The hood is fitted to cover the upper opening of the container and extend down over at least a portion of the outer surface of the at least one sidewall of the container.

In another embodiment, a composting is provided and comprised of a container and a hood. The container is comprised of a permeable fabric, a floor, and at least one sidewall. An upper opening of the container is defined by the at least one sidewall. The at least one sidewall has an inner surface and an outer surface. The hood is configured to retain moisture and heat within the container. The hood is fitted to cover the upper opening of the container and extend down over at least a portion of the outer surface of the at least one sidewall of the container.

BRIEF DESCRIPTION OF THE DRAWINGS

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure.

DETAILED DESCRIPTION

Figure 1:
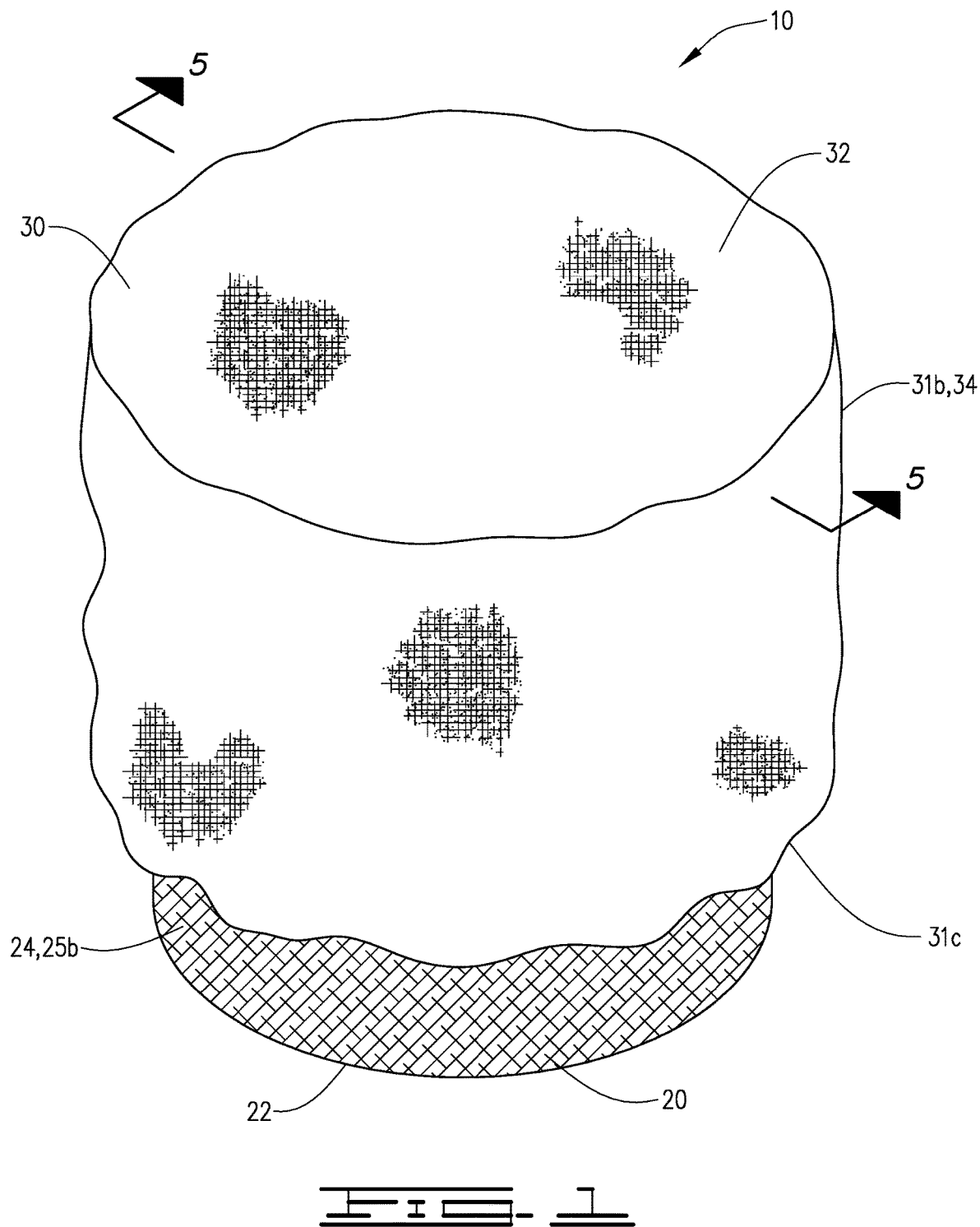
FIG. 1 is a top perspective view of a composting system with the hood covering the upper opening of the container and extending down over the sidewall of the container in accordance with one embodiment of the present disclosure.
Figure 2:
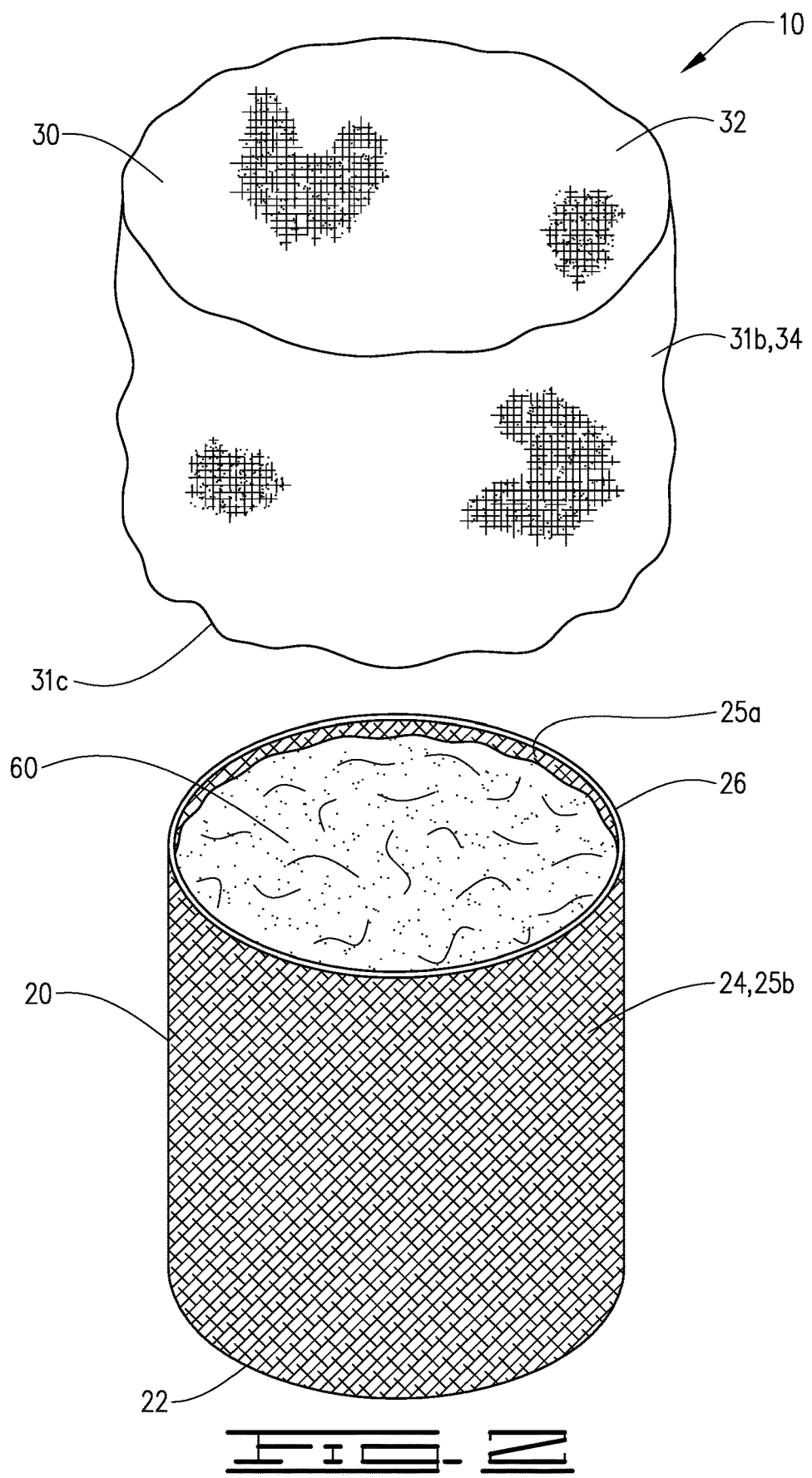
FIG. 2 is a top perspective view of a composting system with the hood about to be placed over the upper opening of the container in accordance with one embodiment of the present disclosure.

The purpose of the disclosed composting system 10 is to hold and compost biodegradable, compostable material. Composting system 10 can then be pulled to a desired garden area, emptied, and then reused. When using composting system 10, regular practices of efficient composting apply. Turning or mixing the composting material is a helpful practice. Composting system 10 includes a hood 30 which is easily removed to allow the composting material 60 within the container 20 to be stirred, mixed and/or turned. Occasionally removing hood 30 and watering composting material 60 is helpful for the composting process. Adding worms to composting material 60 is also helpful in speeding the composting process.

The present disclosure may be understood more readily by reference to these detailed descriptions. For simplicity and clarity of illustration, where appropriate, reference numerals may be repeated among the different figures to indicate corresponding or analogous elements. In addition, numerous specific details are set forth in order to provide a thorough understanding of the various embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Referring now to FIGS. 1-4 generally, the composting system of the present invention is illustrated and generally designated by the numeral 10. As shown by the figures, composting system 10 comprises a container 20 and a hood 30. Container 20 is comprised of a permeable, porous material. The composition of the permeable material of container 20 allows water and air to pass through the floor 22 and the sidewall 24 of container 20 to [the] composting material 60 within container 20. Thus, container 20 is typically formed from a permeable fabric. For example, in some embodiments, container 20 is formed from nonwoven polypropylene fabric. In other embodiments, examples of suitable permeable materials include, but are not limited to, nonwoven polypropylene fabric, woven polypropylene fabric and woven polyethylene fabric, and combinations thereof. The type of permeable material used in construction of container 20 will depend upon the environmental conditions where container 20 will be used and/or manufacturing preferences. In most embodiments, the permeable material is also nonbiodegradable.

Container 20 has a floor 22 and a sidewall 24 which define an upper opening 26 of container 20. Sidewall 24 has an inner surface 25a and an outer surface 25b. For the purposes of this disclosure, floor 22 and sidewall 24 define the structure of container 20, and in turn define upper opening 26 as having a circular shape. However, floor 22 and sidewall 24 may define other shapes for container 20 and upper opening 26 as may be desired by those of ordinary skill in the art. For example, if the user desires to compost large volumes of material, e.g. volumes greater than one hundred gallons, then a rectangular or square shaped container 20 may be more appropriate. In such embodiments, a permeable material with additional rigidity may be required. As will be further detailed below, one of ordinary skill in the art will understand that the size and shape of hood 30 will be adjusted proportionally to match the size and shape of container 20.

In general, hood 30 will be formed from one or more impermeable, non-porous materials. For example, in some embodiments, hood 30 is formed from an extruded polyethylene plastic. In other embodiments, hood 30 is formed from one or more impermeable materials such as, but not limited to, extruded polyethylene plastic, layered and woven polyethylene plastic, woven polyethylene plastic, nonwoven polyethylene plastic, woven polypropylene plastic, nonwoven polypropylene plastic, and combinations thereof. In most embodiments, the impermeable materials used to form hood 30 will be non-biodegradable. Typically, hood 30 will have a thickness between about 0.002 inch and 0.030 inch. More typically, hood 30 will have a thickness of between 0.006 inch and 0.015 inch.

In most embodiments, hood 30 has a top 32 and a sidewall 34. When positioned on container 20, hood 30 will retain moisture and heat within container 20. Thus, when positioned on container 20, hood 30 increases the relative humidity within composting system 10. Typically, hood 30 increases the relative humidity within composting system 10 by about 25% to about 40%. More typically, hood 30 increases the relative humidity within composting system 10 by about 30%.

Hood 30 has an inner surface 31a, outer surface 31b, and a lower end 31c. Inner surface 31a and outer surface 31b of hood 30 continue down sidewall 34. The inner diameter or dimension of hood 30 is slightly larger than the outer diameter or dimension of container 20. Typically, an air gap 50 of about two inches to about twelve inches will exist between inner surface 31a of hood 30 and outer surface 25b of container 20. More typically, an air gap 50 of about six inches will exist between inner surface 31a of hood 30 and outer surface 25b of container 20. When positioned on container 20, hood 30 covers upper opening 26 of container 20 and extends down over at least a portion of outer surface 25b of sidewall 24. In some embodiments, as shown in FIGS. 1, 3, 4, and 5, lower end 31c terminates a distance above the ground surface. Typically, sidewall 34 of hood 30 will extend downward about 25% to about 75% of the total height of sidewall 24 of container 20, e.g., if sidewall 24 is four foot in height, hood 30 will extend downward from about one foot to about three foot from the upper opening 26 of container 20. In some embodiments, sidewall 34 of hood 30 extends downward over at least half of outer surface 25b of sidewall 24.

Hood 30 is manufactured and sized such that when covering container 20 air gap 50 is defined for air circulation in and out of container 20. For example, in some embodiments, hood 30 has a diameter up to six inches wider than the diameter of upper opening 26 of container 20. Air gap 50 between inner surface 31a of hood 30 and outer surface 25b of container 20 allows for air circulation within composting system 10. Although, for the purposes of this disclosure, container 20 and hood 30 have circular shapes, one of ordinary skill in the art will understand that the shape of container 20 and hood 30 may be adjusted to any shape known in the art. One of ordinary skill in the art will further understand that the size and shape of hood 30 will be adjusted proportionally to match the size and shape of container 20.

Figure 3:
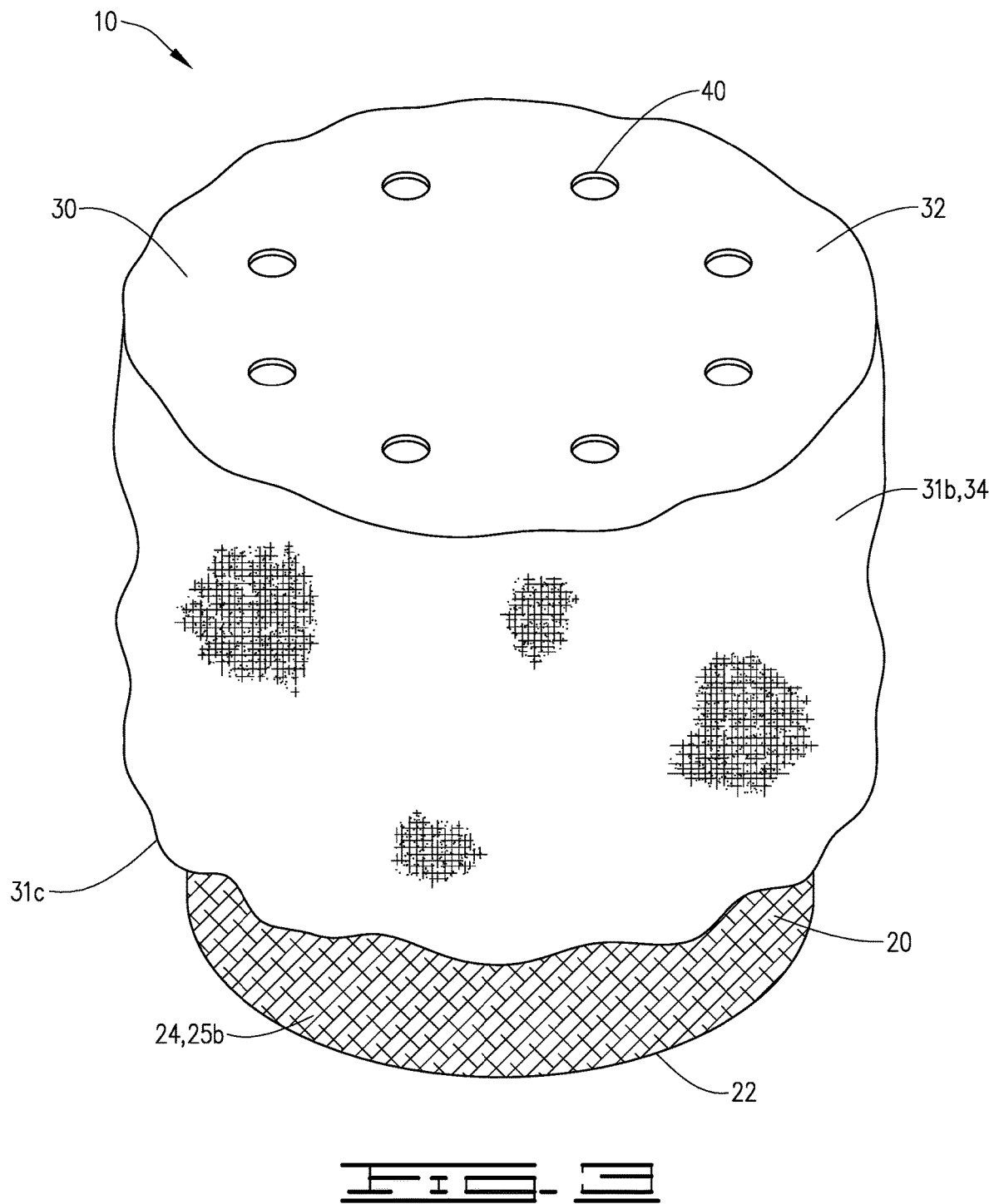
FIG. 3 is a top perspective view of a composting system with the hood, having vents in the top portion of the hood, covering the upper opening of the container and extending down over the sidewall of the container in accordance with one embodiment of the present disclosure.
Figure 4:
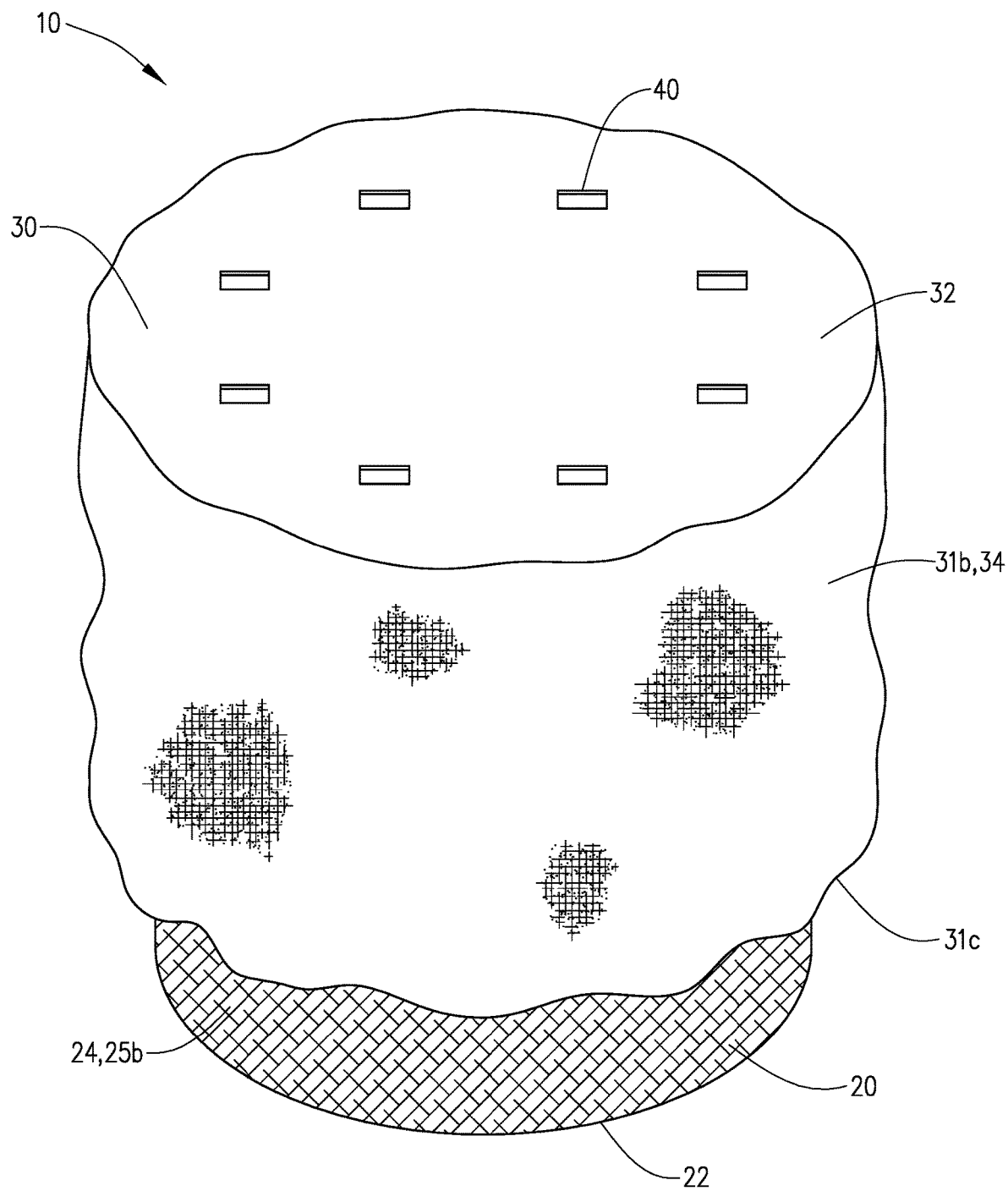
FIG. 4 is a top perspective view of a composting system with the hood, having vents in the top portion of the hood, covering the upper opening of the container and extending down over the sidewall of the container in accordance with one embodiment of the present disclosure.
Figure 5:
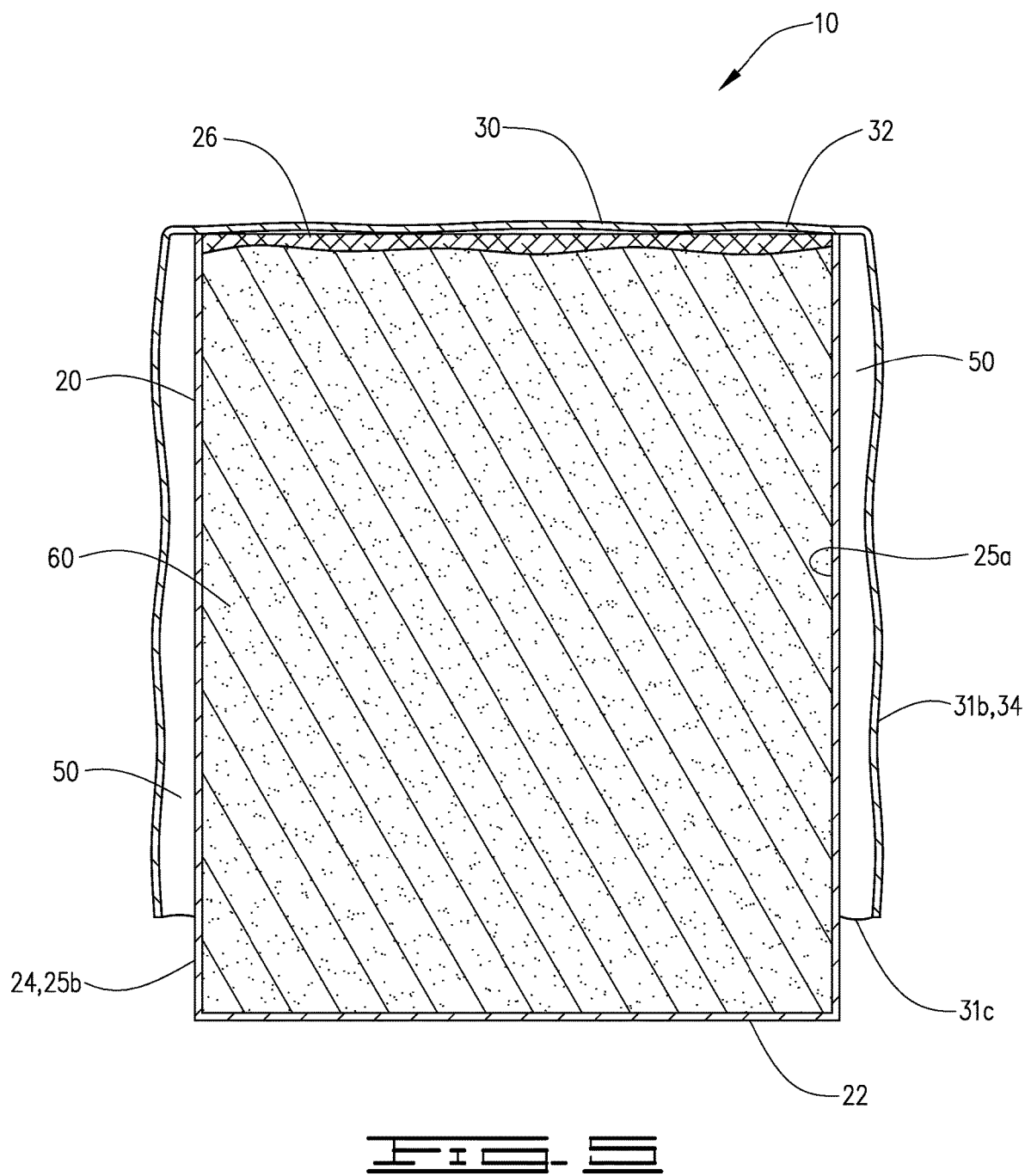
FIG. 5 is a cross-sectional side view of the composting system of FIG. 1 with the hood covering the upper opening of the container and extending down over the sidewall of the container defining an air gap therebetween to permit air circulation in accordance with one embodiment of the present disclosure.

With specific reference to FIGS. 3-4, in one embodiment, top 32 of hood 30 includes one or more vents 40. Vents 40 allow the introduction of rain and/or top watering to composting material 60 within container 20 without having to remove hood 30 from container 20. Vents 40 may be any shape known by those of ordinary skill in the art including, without limitation, slits or circular openings. For the purposes of this disclosure, vents 40 are circular. Additionally, vents 40 may also include a flap. When vents 40 have a circular configuration, vents 40 have a diameter no greater than one inch. Typically, vents 40 will correspond to about 1% to 2% of the total surface area of top 32 of hood 30.

The following examples and test data do not limit the nature of the current disclosure. Rather, this information will enhance the understanding of the current disclosure. The purpose of these examples is to demonstrate the effectiveness of composting system 10 in increasing the properties necessary for efficient composting including temperature and relative humidity.

Example 1

To test the effectiveness of composting system 10, two 100-gallon containers 20 were filled with composting material. Upper openings 26 of containers 20 were 30" in diameter and sidewalls 24 of containers 20 were 36" tall. One container 20 was covered with hood 30 in accordance with the present disclosure, i.e., such container was composting system 10 ("Container I") and the other container 20 was left uncovered, i.e., open to the environment ("Container II"). In this test, hood 30 was made of 4-ounce polyethylene plastic. Hood 30 was approximately 35" in diameter and 24" in length. Therefore, about 12" of sidewall 24 of container 20 of Container I was not covered by hood 30.

To measure the temperature within the composting environments, a thermometer was placed on top of the composting material. In Container I, the thermometer was placed under hood 30 and on top of the composting material. In Container II, the thermometer was placed on top of the composting material open to the environment as Container II was not provided with hood 30. Temperature readings were taken for a period of about eight months. On average, the temperature within the Container I composting environment had a temperature 3 degrees higher than the temperature within the Container II composting environment. Thus, the test results demonstrate the ability of composting system 10 to increase the temperature within the composting environment.

To measure the humidity within the composting environments, a hygrometer was placed on top of the composting material. In Container I, the hygrometer was placed under hood 30 and on top of the composting material. In Container II, the hygrometer was placed on top of the composting material open to the environment as Container II was not provided with hood 30. Humidity readings were taken for a period of about three months. Since the composting environment of Container II was open to the air, the relative humidity reading of the composting environment was about the same as an outdoor reading of relative humidity. On average, the relative humidity of the composting environment within Container I was twenty-five percent (25%) higher than the relative humidity of the composting environment of Container II. Thus, the test results demonstrate the ability of composting system 10 to increase the relative humidity within the composting environment. In particular, measurements after rain fall or watering showed relative humidity levels up to 40% higher within the Container I composting environment when compared to the Container II composting environment.

The demonstrated increase in temperature and relative humidity provided by composting system 10 will in turn decrease the time required for the composting process. Thus, composting system 10 will provide usable compost for growing operations in less time.

Example 2

To further demonstrate the improvements in temperature and relative humidity provided by the current invention, additional readings from Container I and Container II of Example 1 were monitored. One day the outside temperature measured 60° F. and the relative humidity measured 50%. Inside the Container I composting environment, the temperature was 63° F., while the relative humidity measured 70% thereby demonstrating the use of hood 30 improves moisture retention. Measured as grams of water (H2O) per kilogram of air, there are approximately 5.35 grams of water per kilogram of air at 60° F. with a relative humidity of 50%. By raising the temperature to 63° F. with a relative humidity of 70%, each kilogram of air contains 8.49 grams of water. Thus, on this day, use of hood 30 produced a moisture increase of approximately 59%.

Example 3

In the following table, the following meanings will apply:
Temp.=Temperature in Fahrenheit
Rel Hum=Relative Humidity Percentage
H2O=grams of H2O per (/) kg of air

| | Type of Composting System | | | | | |
|---|---|---|---|---|---|---|
| | container only | | | composting system 10 | | |
| | | | | | | % Increase in Moisture Content |
| Date | Temp. | Rel. Hum. | H20 | Temp. | Rel. Hum. | H20 | Compared to Container Only |
| 19-Feb. | 34 | 61% | 2.75 | 36 | 77% | 3.71 | 1.35 |
| 20-Feb. | 50 | 60% | 4.7 | 53 | 68% | 5.91 | 1.26 |

-continued

| | Type of Composting System | | | | | |
|---|---|---|---|---|---|---|
| | container only | | | composting system 10 | | |
| | | | | | | % Increase in Moisture Content |
| Date | Temp. | Rel. Hum. | H20 | Temp. | Rel. Hum. | H20 | Compared to Container Only |
| 21-Feb. | 57 | 49% | 4.89 | 60 | 76% | 8.42 | 1.72 |
| 25-Feb. | 63 | 30% | 3.69 | 66 | 77% | 10.5 | 2.85 |
| 1-Mar. | 56 | 56% | 5.4 | 59 | 83% | 8.88 | 1.64 |

As can be seen in the data above, composting system 10 increased the moisture content within container 20 on all five dates where data was taken. Increasing the moisture content of within the composting environment is crucial to speeding up the composting process. To measure the speed of the composting in the respective composting systems, the amount of actual composted material resulting from the composting process was measured. After six months, the respective composting systems were emptied. The composting material that had not broken down into actual compost was removed. In the container only composting system, the amount of usable compost was approximately 20" wide and approximately 12" high, resulting in a volume of approximately 16 gallons of rich, usable compost. In composting system 10, the amount of usable compost was approximately 26" wide and approximately 16" high, resulting in a volume of approximately 36 gallons of rich, usable compost. The 36 gallons of usable compost in composting system 10 was an approximate increase of 2.25 times more compost than that in the container only composting system.

Thus, it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention.

What is claimed is:

1. A composting system comprising:
   a container comprised of a permeable material, the container having a floor and sidewall defining an upper opening of the container, the sidewall having an inner surface and an outer surface;
   a composting material within the container;
   a hood comprised of an impermeable material and configured to retain moisture and heat within the container, the hood having an inner surface, an outer surface, and a lower end, wherein the hood is fitted to cover the upper opening of the container and extend down over at least a portion of the outer surface of the sidewall of the container, the inner surface of the hood and the outer surface of the sidewall of the container defining an air gap therebetween to permit air circulation into and out of the container; and
   wherein the lower end of the hood terminates a distance above the floor of the container and wherein the hood extends down over about 25% to about 75% of the outer surface of the sidewall of the container.

2. The composting system of claim 1, wherein the impermeable material of the hood is selected from the group consisting of woven polyethylene plastic, nonwoven polyethylene plastic, woven polypropylene plastic, nonwoven polypropylene plastic, and combinations thereof.

3. The composting system of claim 1, wherein the hood includes one or more vents configured to allow moisture through the hood and into the container.

4. The composting system of claim 3, wherein the one or more vents are slits, flaps, or circular openings.

5. The composting system of claim 3, wherein the one or more vents are circular openings having a diameter no greater than one inch.

6. The composting system of claim 1, wherein the hood has a thickness between about 0.002 inch and about 0.030 inch.

7. The composting system of claim 1, wherein the permeable material of the container is selected from the group consisting of nonwoven polypropylene fabric, woven polypropylene fabric, woven polyethylene fabric, and combinations thereof.

8. The composting system of claim 1, wherein the permeable material of the container and the impermeable material of the hood are non-biodegradable.

9. The composting system of claim 1, wherein the air gap defined between the inner surface of the hood and the outer surface of the container is from about two inches to about twelve inches.

10. A method of composting using the composting system as recited in claim 1, the method comprising:
   filling the container comprised of the permeable material with the composting material;
   placing the hood over the upper opening of the container such that the hood covers the upper opening of the container and extends down over at least a portion of the outer surface of the sidewall of the container, the hood having an inner surface, outer surface, and lower end, the inner surface of the hood and the outer surface of the container defining an air gap to permit air circulation into and out of the container, and wherein the lower end of the hood terminates the distance above the floor of the container, and wherein the hood extends down over about 25% to about 75% of the outer surface of the sidewall of the container; and
   circulating air into and out of the container through the air gap.

11. The method of composting of claim 10, further comprising the steps of:
   removing the hood from the container;
   watering the composting material within the container; and
   placing the hood over the upper opening of the container after the watering the composting material step such that the hood extends down over a portion of the outer surface of the sidewall of the container; and
   circulating air into the container through the air gap.

12. The method of composting of claim 10, further comprising the steps of:
   removing the hood from the container;
   introducing worms into the composting material; and
   placing the hood over the upper opening of the container after the introducing the worms step such that the hood extends down over a portion of the outer surface of the sidewall of the container; and
   circulating air into the container through the air gap.

13. The method of composting of claim 10, wherein the hood is an impermeable material selected from the group consisting of extruded polyethylene plastic, woven polyethylene plastic, nonwoven polyethylene plastic, woven polypropylene plastic, nonwoven polypropylene plastic, and combinations thereof.

14. The method of composting of claim 10, wherein the hood has a thickness between about 0.002 inch and about 0.030 inch.

15. The method of composting of claim 10, wherein the permeable fabric of the container is selected from the group consisting of nonwoven polypropylene fabric, woven polypropylene fabric, woven polyethylene fabric, and combinations thereof.

16. The method of composting of claim 10, wherein the air gap defined between the inner surface of the hood and the outer surface of the side of the container is from about two inches to about twelve inches.

17. The method of composting of claim 10, wherein the permeable fabric of the container and the impermeable material of the hood are non-biodegradable.

18. The method of composting of claim 10, further comprising the step of:
   increasing a relative humidity within the container to a level at least 8% above an ambient relative humidity.

* * * * *